United States Patent Office 3,250,766
Patented May 10, 1966

3,250,766
RESCIDINE AND SALTS THEREOF
Alfred Popelak, Mannheim, and Gustav Lettenbauer, Lampertheim, Hesse, Germany, assignors to C. F. Boehringer & Soehne G.m.b.H., Mannheim-Waldhof, Germany, a corporation of Germany
No Drawing. Filed Oct. 24, 1961, Ser. No. 147,162
Claims priority, application Germany, Oct. 27, 1960, B 59,894
4 Claims. (Cl. 260—240)

The present invention relates to the preparation and isolation of a new and valuable alkaloid from plants of the Rauwolfia genus and more particularly to the new alkaloid rescidine and its acid addition salts and to the process of producing same.

A large number of alkaloids have been prepared and isolated from plants of the genus Rauwolfia. Compare, for instance, the comprehensive description of such alkaloids by Manske in "The Alkaloids," vol. VII, pages 62–119, published by Academic Press, New York and London 1960. The Rauwolfia alkaloids reserpine, rescinnamine, and deserpidine or Rauwolfia extracts containing the same have been used as agents in the treatment of hypertension. However, especially when administering large doses of such alkaloids as they are frequently required, they cause side effects which contraindicate their use. Especially harmful are their sedative and psychodepressive activity. After it has been found that said alkaloids are trimethoxy benzoic acid esters or trimethoxy cinnamic acid ester of the reserpic acid methyl ester or, respectively, the 11-desmethoxy reserpic acid methyl ester, attempts have been made to vary the ester component in such compounds in order to produce compounds in which the blood pressure-reducing effect is retained while the sedative effect and/or the psycho-depressive side effects are considerably reduced or completely eliminated. However, such attempts have not yet produced completely satisfactory results.

It is one object of the present invention to provide a new and valuable Rauwolfia alkaloid which has a high blood pressure-reducing activity while its sedative activity is very considerably diminished in comparison to that of reserpine, deserpidine, and even of rescinnamine.

Another object of the present invention is to provide a simple and effective process of producing such a new and valuable alkaloid from plants of the genus Rauwolfia.

Other objects of the present invention and advantageous features thereof will become apparent as the description proceeds.

The new alkaloid has been produced from plants of the genus Rauwolfia and will be designated hereinafter and in the claims annexed hereto as rescidine. As stated above, it has a high blood pressure-reducing activity while its sedative activity is much lower than that of reserpine, deserpidine, and rescinnamine.

The new alkaloid rescidine crystallizes from methanol in colorless needles which melt at 183–186° C. (with decomposition). Its specific optical rotation is $$[\alpha]_D^{22} = -63.4° \pm 0.3°$$

(concentration: 1% in chloroform). Rescidine can also be recrystallized from ethanol and isopropanol. It is substantially insoluble in water, ether, and heptane. It is readily soluble in benzene, acetic acid ethyl ester, acetone, and halogenated aliphatic hydrocarbons such as methylene chloride and chloroform. Its R$_f$-value is 0.24, determined by using paper (Schleicher and Schuell 2043 b. mgl.) impregnated with formamide and by employing a mixture of heptane and methyl ethylene ketone (1:1) in an ammonia atmosphere as developing solvent according to the method described by Kaiser and Popelak in "Chem. Ber." vol. 92, page 278 (1959). Irradiation with ultra-violet light brings out a spot of greenish fluorescence on the paper chromatogram. The compound corresponds to the empirical formula $C_{34}H_{40}O_9N_2$. Its ultraviolet spectrum in methanol shows maxima at $\lambda$ 229 m$\mu$ (log $\epsilon$=4.76) and at $\lambda$ 302 m$\mu$ (log $\epsilon$=4.42) and a minimum at $\lambda$ 2.57 m$\mu$ (log $\epsilon$=3.9). The infrared spectrum shows a characteristic band at 2.95$\mu$ which indicates imino and hydroxyl groups, at 5.78$\mu$ which indicates ester carbonyl groups, and at 6.12$\mu$ which indicates a 6-methoxy indole group. Rescidine has a free alcoholic hydroxyl group which can be esterified quite readily. Investigations which have been carried out indicate that rescidine corresponds to the following formula:

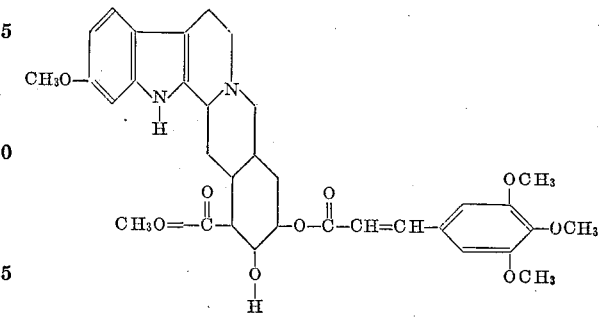

Rescidine is a weak base. It forms acid addition salts, for instance, a difficultly soluble hydrochloride of the melting point 217–220° C. (with decomposition) and an oxalate of the melting point 187–188° C. (with decomposition). Rescidine is soluble in an excess of dilute acetic acid or phosphoric acid, whereby the acetate or, respectively, the phosphate are formed.

Extracts obtained from Rauwolfia plants and preferably extracts obtained from *Rauwolfia vomitoria* are used as starting materials for the preparation of the new active agent. Such extracts are prepared by extracting parts of the plant with water, water-miscible solvents such as alcohol, or solvents which are only partly miscible with water such as aromatic hydrocarbons, ether, acetic acid ester, or halogenated aliphatic hydrocarbons, for instance, chloroform or methylene chloride. Extraction may be carried out with the addition of alkaline agents, for instance, of sodium carbonate, ammonia, and the like, or with the addition of inorganic or, respectively, organic acids such as phosphoric acid or acetic acid. Preferred extracts for preparing rescidine are extracts which have been obtained by extracting the plant with benzene at a pH between about 6.0 and about 7.0 after preliminary defattening with solvents for lipids such as petroleum ether, ligroine, carbon tetrachloride, and the like. Mother liquors obtained on preparing reserpine from Rauwolfia extracts may also be used as starting materials.

The process of producing the new alkaloid rescidine comprises fractionating the extracts and purifying the resulting crude products by recrystallization preferably after repeated fractionation. Fractionation is effected by fractional crystallization, by chromatographic adsorption treatment, or by means of multiple phase distribution between two phases which are only partly miscible with each other.

Fractional crystallization is preferably carried out in isopropanol or methanol. The two alcohols may also be used in mixture with each other or subsequent to each other. Thus, for instance, the extract concentrated by evaporation is first recrystallized from methanol. The resulting crystals are separated and the solvent is distilled off from the mother liquor. The evaporation residue is then again dissolved in isopropanol and allowed to crystallize. This second batch of crystals contains the rescidine. The rescidine isolated in this manner is still impure and is further purified by crystallization, adsorption chromatography, or multiple phase distribution.

Preparation of rescidine from extracts and/or purification of the crude crystals by chromatographic adsorption is carried out by means of known adsorbing agents such as aluminum oxide, kieselguhr, and preferably silica gel. The adsorbing agent is eluted by means of halogenated low molecular aliphatic hydrocarbons or of aromatic hydrocarbons or mixtures thereof, if required, with the addition of low molecular alcohols. The preferred eluting solvent is benzene to which methanol in increasing amounts from 0% to 3% is added.

For preparing rescidine from extracts and/or for purifying the crude crystals of rescidine by the method of multiple phase distribution, the extract evaporated to dryness or, respectively, the crude crystals are distributed between a mixture of water and a polar solvent, on the one hand, and a solvent which is only partly miscible with said mixture and which is either weakly polar or nonpolar, on the other hand. Suitable two-phase systems are, for instance, a mixture of methanol and water (2:1), on the one hand, and carbon tetrachloride, on the other hand, or, respectively, a mixture of methanol and water (7:3), on the one hand, and a mixture of benzene and chloroform (6:4), on the other hand.

It is also possible to make use of the formation of difficultly soluble acid addition salts of rescidine for supplementing the above mentioned processes and further purifying rescidine. Such difficultly soluble salts may be prepared in the course of any of the above mentioned preparation and/or purification steps. Especially suitable has proved the preparation of the oxalic acid addition salt.

In order to finally recrystallize the crude rescidine so as to produce the pure base, low molecular primary or secondary alcohols such as methanol, ethanol, isopropanol, or mixtures thereof may be used with advantage.

The following examples serve to illustrate the present invention without, however, limiting the same thereto:

*Example 1*

10 kg. of ground roots of Rauwolfia *vomitoria* are percolated by means of about 60 liters of methanol at room temperature. The percolated extract is concentrated by evaporation in a vacuum to a volume of about 5 liters. 2.5 l. of acetic acid are added thereto. The resulting mixture is freed of fat by a treatment with ligroine, whereby defattening is repeated 3 times and 500 cc. of ligroine are used each time. The resulting brown solution is adjusted to a pH of 6.5–6.9 by the addition of ammonia and is exhaustively extracted with benzene. The combined benzene extracts are washed with water, dried over sodium sulfate, and evaporated to dryness in a vacuum.

The resulting residue A obtained by benzene extraction in an amount between about 50 g. and about 70 g. is dissolved in five times its amount of a mixture of isopropanol and methanol (3:1) while heating. The solution is cooled and allowed to crystallize. The resulting crystals are filtered off by suction after about 10 hours, the filtrate is concentrated by evaporation to half its volume and is again allowed to crystallize. After standing for one day, about 10 g. of a crystalline product are obtained. This second batch of crystals which contains rescidine is dissolved in 100 cc. of benzene and is passed through a chromatographic column of about 150 g. of silica gel. The silica gel is eluted by means of benzene with the addition of methanol in amounts increasing from 0% to 3%. The resulting eluate is recovered in fractions. The fractions obtained with benzene containing 2% and 3% of methanol contain the rescidine. These fractions are combined and concentrated by evaporation. The residue is recrystallized from five times its amount of a mixture of isopropanol and methanol (3:1). After repeated recrystallization from twenty times its amount of methanol, about 4 g. of rescidine of the melting point 183–186° C. (with decomposition) are obtained.

*Analysis.* — $C_{34}H_{40}O_9N_2$; molecular weight: 620.70. Calculated: 65.79% C; 6.49% H; 4.52% N; 25.00% $OCH_3$. Found: 65.74% C; 6.51% H; 4.49% N; 24.80% $OCH_3$. Optical rotation $[\alpha]_D^{22} = -63.4° \pm 0.3°$ (concentration: 1% in chloroform).

*Example 2*

30 g. of residue A obtained by benzene extraction according to Example 1 are dissolved in 200 cc. of methanol. The solution is allowed to stand for 12 hours in order to complete crystallization. The crystals which consist mainly of reserpine are separated and the filtrate is evaporated to dryness in a vacuum. The evaporation residue is dissolved in three times its amounts of isopropanol and the solution is allowed to crystallize at room temperature. After standing for two days, the crystals are filtered off by suction and are dried. The resulting crystals (about 5 g.) are subjected to a three-phase distribution process between the phase system methanol and water (2:1), on the one hand, and carbon tetrachloride, on the other hand. The final methanolic-aqueous phase is then exhaustively extracted by means of benzene and the benzene extracts are evaporated to dryness in a vacuum. The dry residue is recrystallized first from a mixture of isopropanol and methanol (3:1) and subsequently from methanol alone. Yield: 2.1 g. of rescidine of the melting point 183–186° C. (with decomposition).

*Example 3*

30 g. of residue A obtained by benzene extraction according to Example 1 are dissolved in 100 cc. of benzene. The solution is passed through a chromatographic column consisting of 400 g. of silica gel. The silica gel is first eluted with 500 cc. of pure benzene, then with 500 cc. of benzene containing 0.5% of methanol, thereafter with 1500 cc. of benzene containing 1% of methanol, and finally with 1000 cc. of benzene containing 2% of methanol.

Fractions of 100 cc. each are recovered. The fractions obtained on elution with benzene containing 2% of methanol contain rescidine. They are combined and are evaporated to dryness in a vacuum. The residue is first recrystallized from a mixture of isopropanol and methanol (3:1) and subsequently from methanol.

Yield: 2.0 g. of rescidine of the melting point 183° C. (with decomposition).

*Example 4*

30 g. of the residue of a mother liquor obtained from recovering reserpine from Rauwolfia plants, are dissolved in 100 cc. of isopropanol. 30 cc. of a 10% solution of oxalic acid in isopropanol are added thereto. The precipitated oxalate obtained after standing for several hours is filtered off by suction and is recrystallized from a mixture of isopropanol and methanol (2:1). 18 g. of oxalate are obtained which are subjected to three-stage multiple phase distribution between the phase system methanol and water (7:3), on the one hand, and the phase system benzene and chloroform (6:4), on the other hand. The final methanolic-aqueous phase is rendered alkaline by the addition of ammonia and is then exhaustively extracted with benzene. The residue obtained on distilling off the benzene is first recrystallized from a mixture of isopropanol and methanol (3:1), and subsequently from methanol. 1.8 g. of rescidine of the melting point 183° C. (with decomposition) are obtained in this manner.

To produce the hydrochloride, the base is dissolved in 10 cc. of 2 N acetic acid. 2 N hydrochloric acid is then added drop by drop to said solution until precipitation is completed. The precipitated hydrochloride is filtered off by suction, washed with water, and dried. Melting point of the hydrochloride 220° C. (with decomposition).

Other acid addition salts than the oxalate, the hydrochloride, the acetate, and the phosphate may be produced in a manner known per se, for instance, the salts with other inorganic acids such as hydrobromic acid, sulfuric acid, nitric acid, or with other organic acids, such as succinic acid, maleic acid, malonic acid, citric acid, tartaric acid, malic acid, benzoic acid, salicylic acid, hydroxy ethane sulfonic acid, toluene sulfonic acid, nicotinic acid, isonicotinic acid, and with other substantially non-toxic and pharmaceutically acceptable acids.

Rescidine can readily be esterified by reaction with benzoylchloride in a manner known per se. Benzoyl rescidine melts at 237–238° C. on recrystallization from methanol.

*Analysis.*—$C_{41}H_{44}O_{10}N_2$. Calculated: 67.94% C; 6.12% H; 3.87% N; 21.40% $OCH_3$. Found: 68.15% C; 6.02% H; 3.99% N; 21.40% $OCH_3$.

On alkaline saponification of rescidine, 3,4,5-dimethoxy cinnamic acid of the melting point 127° C. and a second acid of the empirical formula $C_{21}H_{26}O_5N_2$ and the melting point 278–280° C. (with decomposition) is isolated.

*Analysis.*—Calculated: 65.26% C; 6.78% H; 7.25% N. Found: 64.93% C; 6.91% H; 7.15% N.

Said acid will be designated hereinafter as rescidinic acid. It is converted by reaction with diazomethane into its methyl ester of the empirical formula $C_{22}H_{28}O_5N_2$.

*Analysis.*—Calculated: 65.88% C; 7.05% H; 7.00% N. Found: 65.68% C; 7.02% H; 6.98% N. Melting point: 237° C.

Rescidinic acid corresponds to the formula

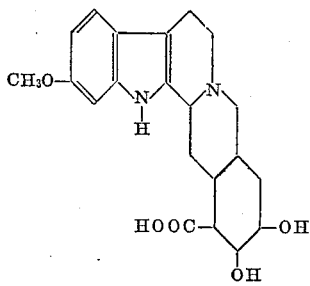

while its methyl ester corresponds to the formula

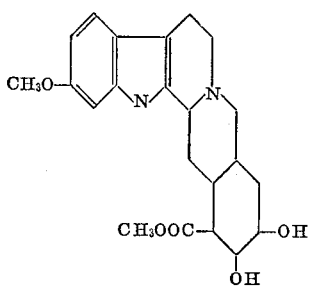

Reserpine and rescidine according to the present invention were compared pharmacologically. Thereby, it was found that the central effects of rescidine were very considerably diminished as compared with those of reserpine while its peripheral effects were of about the same magnitude.

The sedative effect on mice was about 50 times weaker than that of reserpine. Administration of 1 mg./kg. of reserpine to rats completely abolishes conditional reflexes in rats while even 80 mg./kg. of rescidine do not substantially affect such reflexes.

It was necessary to administer to cats 10 to 20 times larger doses of rescidine than of reserpine in order to obtain the same sedative effects.

The blood pressure of hypertensive rats was more strongly lowered by administration of 0.5 mg./kg. of rescidine than by administration of the same dose of reserpine.

Rescidine proved to be substantially nontoxic. Doses of 1 g./kg. were well tolerated by mice.

Tests carried out with rabbits in urethane narcosis showed that rescidine has about the same blood pressure lowering activity as reserpine. It was of an activity similar to that of reserpine with respect to the inhibition of the carotid sinus reflex.

5 mg./kg. of rescidine had no sedative effect on rabbits while 1 mg./kg. of reserpine had already a substantial sedative effect.

The sedative effect of rescidine on administration to dogs was about 10 times as low as that of the same amount of reserpine.

A comparison with one of the most effective blood pressure reducing agents of the reserpine series, namely with carbethoxy syringoyl methyl reserpate showed that it is as effective as that compound while its central activity is still further reduced.

All these pharmacological tests were carried out by subcutaneous administration.

The new compound has successfully been used in reducing blood pressure in cases of arterial hypertension. It may be used as such or, in more severe hypertension which required more potent agents, as adjuvant to such more potent drugs so as to reduce the dosage required of such other drugs and to alleviate their side-effects.

Ordinarily, rescidine or its acid addition salts are administered orally in the form of powders or of tablets or other solid shaped preparations. Parenteral administration in the form of its water soluble acid addition salts or of suspensions of rescidine or its water insoluble salts and rectal administration in the form of suppositories and the like is, of course, also possible.

Of course, many changes and variations may be made in the starting materials used for producing the new Rauwolfia alkaloid, in the solvents employed, in the methods or recovering and isolating the alkaloids from Rauwolfia extracts and of purifying the crude products, in the preparation of the acid addition salts, and the like may be made by those skilled in the art in accordance with the principles set forth herein and in the claims annexed hereto.

We claim:

1. The crystalline product of manufacture consisting of rescidine of the formula

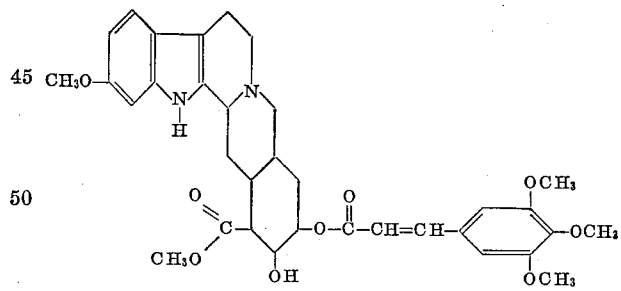

said rescidine melting at about 183–186° C. (with decomposition) and its optical rotation being $$[\alpha]_D^{22} = -63.4° \pm 0.3°$$

(concentration: 1% in chloroform), said rescidine being obtained from Rauwolfia plants by solvent extraction and fractionating the resulting extracts.

2. The crystalline product of manufacture consisting of the hydrochloride of rescidine of the formula

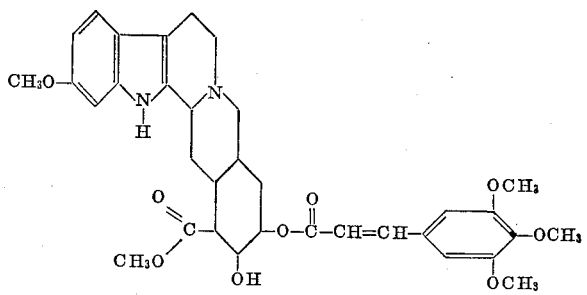

said hydrochloride melting at about 217–220° C. (with decomposition).

3. The crystalline product of manufacture consisting of the oxalate of rescidine of the formula

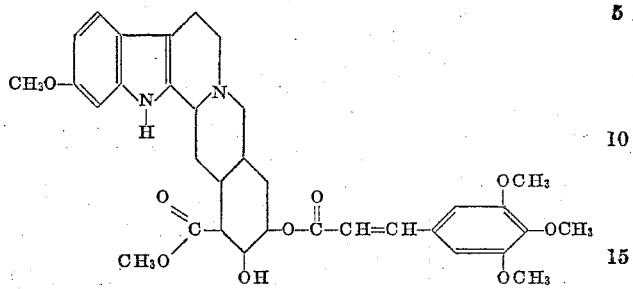

said oxalate melting at about 187–188° C. (with decomposition).

4. The crystalline product of manufacture consisting of a rescidine compound selected from the group consisting of rescidine of the formula

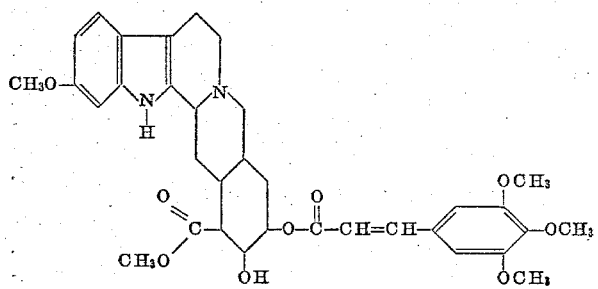

said rescidine melting at about 183–186° C. (with decomposition) and its optical rotation being $$[\alpha]_D^{22} = -63.4° \pm 0.3°$$

(concentration: 1% in chloroform), said rescidine being obtainable from Rauwolfia plants by solvent extraction and fractionating the resulting extracts, and its pharmaceutically acceptable aid addition salts.

References Cited by the Examiner
UNITED STATES PATENTS

| | | | |
|---|---|---|---|
| 2,854,454 | 9/1958 | Ulshafer | 260—287 |
| 2,857,385 | 10/1958 | Keuhne | 260—286 |
| 2,964,451 | 12/1960 | Pan et al. | 260—236 |

FOREIGN PATENTS

| | | |
|---|---|---|
| 556,495 | 10/1957 | Belgium. |
| 845,522 | 8/1960 | Great Britain. |

OTHER REFERENCES

Degering: An Outline of Organic Nitrogen Compounds, Univ. Litho-Printers, Ypsilanti, Mich. (1950), p. 580.

Ferguson: The Lancet (December 1956), pp. 389 and 390.

Klohs et al.: Chemistry and Industry (March 1956), pp. 187 and 188.

Van Tamelen et al.: Jour. American Chem. Soc., vol. 79 (1957), pp. 5256–5262.

IRVING MARCUS, *Primary Examiner.*

NICHOLAS S. RIZZO, WALTER A. MODANCE,
*Examiners.*